Nov. 11, 1924.  
W. J. O'LEARY  
SAFETY CLUTCH FOR PRIME MOVERS OR THE LIKE  
Filed July 12, 1919
1,514,716
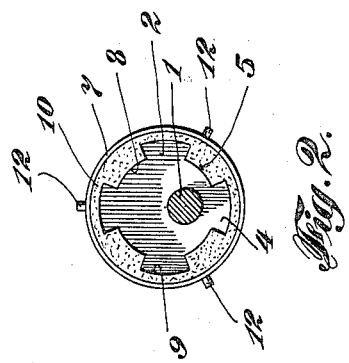
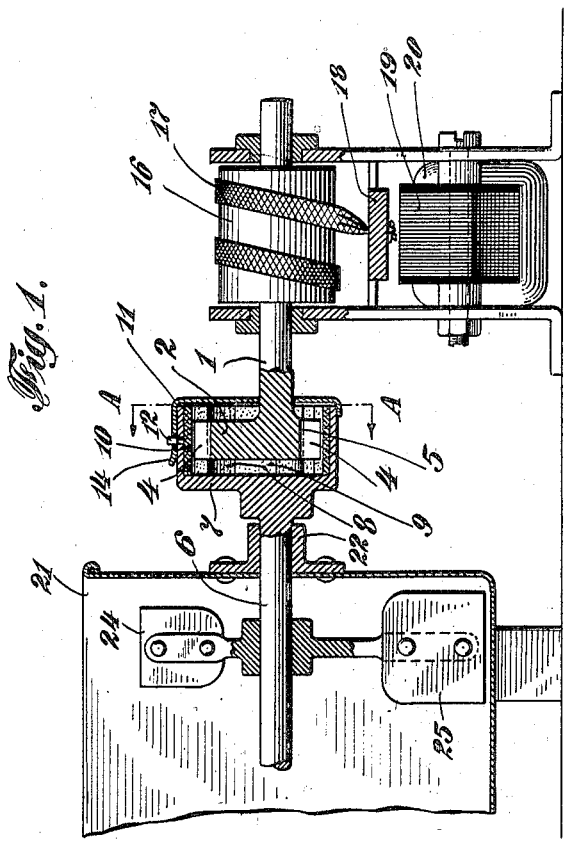
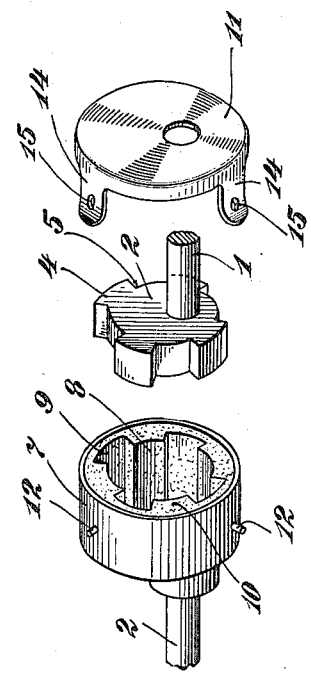
William J. O'Leary  
Inventor
By George Ramsey  
Attorney Patented Nov. 11, 1924.

1,514,716

UNITED STATES PATENT OFFICE.

WILLIAM J. O'LEARY, OF MONTREAL, QUEBEC, CANADA, ASSIGNOR TO MARGUERITE V. O'LEARY, OF MONTREAL, CANADA.

SAFETY CLUTCH FOR PRIME MOVERS OR THE LIKE.

Application filed July 12, 1919. Serial No. 310,511.

*To all whom it may concern:*

Be it known that I, WILLIAM J. O'LEARY, a subject of the King of England, residing at Montreal, in the Province of Quebec, Dominion of Canada, have invented certain new and useful Improvements in Safety Clutches for Prime Movers or the like, of which the following is a specification.

This invention relates broadly to a safety clutch or coupling between a prime mover and a driven member.

The principal object of the present invention is to provide a clutch or connector constructed in such manner as to render it difficult for a user to connect the prime mover with any device other than that for which the prime mover is particularly constructed.

Another object of the present invention is a clutch or connector of the character specified and wherein it comprises a safety device to prevent the prime mover from being used for any purpose other than that for which it is intended.

A still further and important object of the present invention is a connector or clutch for a prime mover having parts thereof so related that they may be interlocked only when the shaft of the driven member and the shaft of the prime mover are in a predetermined position one relatively to the other.

A still further and important object of the present invention is a connector or clutch of the character specified wherein the interlocking members of the clutch are offset and arranged to compensate for unbalanced conditions in the driven device whereby the assembling of the prime mover with the driven device comprises a balanced mechanism.

Another and important object of the present invention is a clutch or connector of the character specified and wherein one element thereof is integral with the motor shaft and another element thereof is integral with the driven shaft so that neither element may be removed without destructive effort, thereby comprising a safety device to prevent the use of the motor with apparatuses other than that for which it is intended.

Other and further objects of the present invention will in part be obvious and will in part be pointed out hereinafter in the specification following and by reference to the accompanying drawings wherein like characters will be used to represent like parts throughout the several figures thereof.

Figure 1 is a sectional view through the connector or clutch and illustrating a portion of a motor and a portion of a mixer or beater.

Figure 2 is a sectional view taken on line A—A and looking in the direction of the arrows.

Figure 3 is a detail perspective view of the clutch showing the members thereof disengaged.

Where prime movers, particularly electric motors and the like, are designed for a particular type of work, it often happens that such motors will not work properly or efficiently if used for purposes other than that for which they were intended. This is particularly true of the vibration motor shown in McDonald Patents No. 1,250,914, issued December 18, 1917, and No. 1,290,264, issued January 7, 1919.

In the motor shown in these patents changes in construction of the motor change the period of vibration of the power elements thereof and therefore change the character of the motor as to its torque and also as to its speed. It has been found desirable in the manufacture of these motors to design a particular motor for a particular type or character of use. Where such specially designed motor is utilized for purposes other than that for which it is designed it frequently happens the motor either is injured or it does not perform satisfactorily thereby disappointing the user and unjustly injuring the reputation of the motor.

The clutch or connector comprising the present invention, among other uses, prevents a motor from being used with devices other than that for which it is intended, and therefore this connector or clutch is a safety device which insures the proper use of a motor or prime mover.

The invention also contemplates other features, such as compensating for unbalanced conditions in driven devices and for preventing transmission of undue noise and vibration.

The present invention may broadly be characterized by providing one clutch member integral with the motor shaft and the other clutch member integral with the driven shaft. By integral it is meant that the clutch members shall be so connected to the shafts, either by being made from the same metal as the shaft or by being welded to the shaft, that the members cannot be removed from the shafts without destructive effort. Preferably these members will be made of very hard metal so that it will be difficult to remove the parts by destructive effort without injuring or destroying the motor or the driven member.

Referring now to the drawings wherein I have illustrated one embodiment of my invention, which invention however is capable of being embodied in other structures, the motor shaft 1 carries a driving head 2 which is integral with the motor shaft. This driving head 2 may comprise a notched disk the axis of which is offset relatively to the axis of the motor shaft. This disk is provided with projections 4 separated by notches 5. The driven shaft 6 carries a housing 7 which is integral with the driven shaft. This housing 7 is provided with projections and notches 8 and 9 which are complemental to the projections and notches 4 and 5 on the driving head. Preferably the interlocking projections and notches are so constructed, by being of different sizes or conformations, that the driving head 2 will interlock with the housing 7 only when the shafts 1 and 6 are in predetermined rotative relation. The housing 7 is also constructed eccentric relatively to the axis of the driven shaft 6 so that when the driving head 2 and the housing 7 are interlocked the motor shaft 1 and the driven shaft 6 are both on a common axis. By referring to Figures 1 and 2 it will be noted that the axis of the disk and the axis of the housing are eccentric to the axes of rotation of the shafts 1 and 6, and it will also be noted that the depth of the housing is considerably greater than the thickness of the disk so that there is an allowance for endwise movement between these parts. This serves to permit a slightly greater flexibility of the parts than where they are rigidly fastened together and no endwise movement is allowed.

Under certain conditions it is desirable to provide a sound-deadening or vibration-absorbing medium in this construction, and I have illustrated the interior portion 10 as being made from felt or other fibrous material which is set with suitable attaching means, such as cement or rivets, into the shell of the housing. This felt lining is resilient and at the same time of sufficient strength to transmit the power required.

In order to prevent disengagement of the parts and to comprise a means for preventing dirt or foreign matter from accumulating in the housing, a separate cover 11 may be provided. This separate cover may be secured by means of lugs 12 on the housing and spring fingers 14 on the cover, which fingers are provided with openings 15 that are adapted to interlock with the lugs 12.

The motor shaft 1 carries a drum 16 which is encircled by a tape 17 having one end anchored to a suitable anchor, not shown, and the other end anchored to an armature 18 which is mounted to vibrate above the core 19 of the electro-magnet 20. When the electro-magnet is energized by a suitable pulsating current, waves are established in the tape and the drum is rotated in accordance with the principles of the motor illustrated in the McDonald patents above referred to.

In the present case the clutch or connector is shown as connecting an electric motor with a beater wherein the shaft 6 extends into a container 21, through a bushing 22, and carries beater blades 24 and 25. It will be noted that the beater blade 24 operates on a shorter radius than the beater blade 25 whereby the material both adjacent and distant from the shaft 6 is thoroughly agitated. This arrangement tends to unbalance the masses of rotation carried by the shaft 6 and it will be noted that the eccentricity of the driving head 2 and the housing 7 is so arranged as to compensate for this unbalanced condition in the beater.

It is to be understood that the parts herein disclosed are illustrative and that the principle of the invention may be applied in other ways and by other means and to other devices than those specifically shown which are for purposes of illustration merely.

Having described and illustrated my invention, what I claim is:

1. A safety coupler adapted to connect a predetermined motor with a predetermined driven member, said coupling comprising a pair of interlocking members, one of which is carried by the motor shaft and the other of which is integral with the driven shaft, said interlocking members being eccentrically arranged, and means whereby said interlocking members can only be assembled when the axis of the driven shaft and the axis of the motor shaft coincide.

2. A safety coupler adapted to connect a predetermined motor with a predetermined driven member, said coupling comprising a pair of interlocking members, one of which is a toothed head carried by the motor shaft and the other of which is a housing integral with the driven shaft, said interlocking members being eccentrically arranged, and means whereby said interlocking members can only be assembled when the axis of the driven shaft and the axis of the motor shaft coincide.

3. A safety coupler adapted to connect a predetermined motor with a predetermined driven member, said coupling comprising a pair of interlocking members, one of which is a toothed head carried by the motor shaft and the other of which is a housing integral with the driven shaft, said interlocking members being eccentrically arranged, a resilient transmission member between the interlocking members, and means whereby said interlocking members can only be assembled when the axis of the driven shaft and the axis of the motor shaft coincide.

4. A safety coupling adapted to connect a predetermined motor and a predetermined driven member, said safety connection comprising a toothed disk, in combination with a toothed housing, the teeth on said disk and housing being arranged one to another in such manner that the parts can only be assembled when a definite predetermined rotative relation is established between said disk and said housing.

5. A safety coupling adapted to connect a predetermined motor and a predetermined driven member, said safety connection comprising a toothed disk, in combination with a toothed housing, the teeth in said disk and housing each being arranged of a different size and so arranged one to another that the parts can only be assembled when a definite predetermined rotative relation is established between said disk and said housing.

6. A safety coupling adapted to connect a predetermined motor and a predetermined driven member, said safety connection comprising a toothed disk, in combination with a toothed housing, the teeth on said disk and housing being arranged one to another in such manner that the parts can only be assembled when a definite predetermined rotative relation is established between said disk and said housing, and a telescoping cap to retain the parts connected.

7. A safety connector between a predetermined motor and a predetermined driven member, said connector comprising a toothed disk, in combination with a complemental toothed housing, the axis of the disk and the axis of the housing being eccentric to their axes of rotation when the coupling is transmitting power.

8. A safety connector between a predetermined motor and a predetermined driven member, said connector comprising a toothed disk, in combination with a complemental toothed felt ring, and a housing carrying the said ring, the axis of the disk and the axis of the housing being eccentric to their axes of rotation when the coupling is transmitting power.

9. A safety connector between a predetermined motor and a predetermined driven member, said connector comprising a toothed disk, in combination with a complemental toothed housing, the axis of the disk and the axis of the housing being eccentric to their axes of rotation when the coupling is transmitting power, and the depth of the housing being greater than the thickness of the disk to allow endwise movement of the parts.

10. A safety connector between a predetermined motor and a predetermined driven member, said connector comprising a toothed disk, in combination with a complemental toothed felt ring, a housing carrying the said ring, the axis of the disk and the axis of the housing being eccentric to their axes of rotation when the coupling is transmitting power, and the depth of the housing being greater than the thickness of the disk to allow endwise movement of the parts, and means to prevent disengagement of the parts.

11. In a device of the character specified the combination of a motor, an unbalanced driven device, and a counterbalancing connector between said motor and said device whereby the unbalanced condition of the driven member is compensated by the connector in such manner that the combination is a balanced entity.

12. In a device of the character specified, the combination of a motor, an unbalanced driven device, and an eccentric counterbalancing connector between said motor and said device whereby the unbalanced condition of the driven member is compensated by the connector in such manner that the combination is a balanced entity.

WM. J. O'LEARY.